(12) United States Patent
Oroskar et al.

(10) Patent No.: US 9,445,344 B1
(45) Date of Patent: Sep. 13, 2016

(54) PREFERENTIALLY ASSIGNING DATA SLOTS SUBJECT TO BUNDLED ACKNOWLEDGMENTS TO DEVICES THAT SUPPORT CARRIER AGGREGATION

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 129 days.

(21) Appl. No.: 14/337,861

(22) Filed: Jul. 22, 2014

(51) Int. Cl.
*H04L 1/16* (2006.01)
*H04W 40/02* (2009.01)
*H04L 5/14* (2006.01)
*H04L 1/18* (2006.01)

(52) U.S. Cl.
CPC ............ *H04W 40/02* (2013.01); *H04L 1/1887* (2013.01); *H04L 5/14* (2013.01)

(58) Field of Classification Search
CPC .......... H04L 1/18; H04L 1/16; H04W 72/04; H04W 72/12; H04W 74/04; H04W 52/04; H04W 52/14; H04W 52/34; H04W 72/005; H04W 72/02; H04W 72/044; H04W 72/06; H04W 72/08; H04W 72/1263; H04W 72/1273; H04W 72/1284; H04W 74/002; H04W 74/004
USPC ........ 370/252, 280, 310, 328–329, 338–330; 709/207, 223–224
See application file for complete search history.

(56) References Cited

U.S. PATENT DOCUMENTS

| 6,308,294 | B1 | 10/2001 | Ghosh et al. |
| 6,631,127 | B1 | 10/2003 | Ahmed et al. |
| 6,697,987 | B2 | 2/2004 | Lee et al. |
| 6,925,132 | B2 | 8/2005 | Song et al. |
| 7,002,993 | B1 | 2/2006 | Mohaban et al. |
| 7,136,929 | B2 | 11/2006 | Koprivica |
| 7,206,280 | B1 | 4/2007 | Khan et al. |

(Continued)

FOREIGN PATENT DOCUMENTS

WO 2007/059523 5/2007

OTHER PUBLICATIONS

3GPP Long Term Evolution (LTE), May 15, 2012, 4 pages, http://4g-lte-world.blogspot.com/2012/05/tti-bundling-in-lte.html?m=1.

(Continued)

*Primary Examiner* — Mohamed Kamara (57) ABSTRACT

It may be determined that a hybrid automatic repeat request (HARQ) transmission schedule from a radio access network (RAN) to wireless communication devices (WCDs) uses HARQ acknowledgment bundling for a first set of two or more data slots, and that the HARQ transmission schedule does not use HARQ acknowledgment bundling for a second set of one or more data slots. It may further be determined that a first WCD supports carrier aggregation when receiving communications from the RAN, and that a second WCD does not support carrier aggregation when receiving communications from the RAN. Based on the first WCD supporting carrier aggregation, the RAN may transmit a first data to the first WCD in the first set of data slots. Based on the second WCD not supporting carrier aggregation, the RAN may transmit a second data to the second WCD in the second set of data slots.

20 Claims, 7 Drawing Sheets

(56) References Cited

U.S. PATENT DOCUMENTS

| | | | |
|---|---|---|---|
| 7,388,919 | B2 | 6/2008 | Varma et al. |
| 7,447,968 | B2 | 11/2008 | Ha et al. |
| 7,715,347 | B2 | 5/2010 | Yoon et al. |
| 7,978,626 | B1 | 7/2011 | Khanka et al. |
| 8,634,333 | B2* | 1/2014 | Sarkar .............. H04L 1/16 370/278 |
| 2004/0141525 | A1 | 7/2004 | Bhushan et al. |
| 2004/0179475 | A1 | 9/2004 | Hwang et al. |
| 2006/0013216 | A1 | 1/2006 | Rajkotia et al. |
| 2006/0109810 | A1 | 5/2006 | Au et al. |
| 2007/0070952 | A1 | 3/2007 | Yoon et al. |
| 2007/0091816 | A1 | 4/2007 | Lee et al. |
| 2007/0110095 | A1 | 5/2007 | Attar et al. |
| 2007/0168822 | A1 | 7/2007 | Vitebsky et al. |
| 2007/0214400 | A1 | 9/2007 | Smith et al. |
| 2007/0300120 | A1 | 12/2007 | Kim et al. |
| 2008/0130643 | A1 | 6/2008 | Jain et al. |
| 2008/0168321 | A1 | 7/2008 | Lim et al. |
| 2008/0194284 | A1 | 8/2008 | Choi et al. |
| 2009/0016265 | A1 | 1/2009 | Katayama et al. |
| 2009/0129276 | A1 | 5/2009 | Dendy |
| 2009/0319854 | A1 | 12/2009 | Qian et al. |
| 2009/0327443 | A1* | 12/2009 | Pawar ................ H04L 1/1607 709/207 |
| 2010/0091735 | A1 | 4/2010 | Kim et al. |
| 2010/0135156 | A1 | 6/2010 | Sarkar |
| 2010/0272048 | A1* | 10/2010 | Pan ................... H04L 1/1635 370/329 |
| 2012/0039227 | A1 | 2/2012 | Chen et al. |
| 2012/0087254 | A1* | 4/2012 | Yin .................... H04L 1/0031 370/252 |
| 2012/0257588 | A1* | 10/2012 | Umeda ............... H04L 5/001 370/329 |
| 2012/0314679 | A1* | 12/2012 | Lee ................... H04L 5/0053 370/329 |
| 2013/0128854 | A1* | 5/2013 | Nakashima ......... H04W 52/246 370/329 |
| 2013/0322358 | A1* | 12/2013 | He ................... H04W 72/0406 370/329 |
| 2015/0223240 | A1* | 8/2015 | Choi .................. H04L 1/1861 370/329 |
| 2015/0237644 | A1 | 8/2015 | Golitschek Edler von Elbwart et al. |
| 2015/0341945 | A1* | 11/2015 | Panchal .............. H04L 5/0098 370/329 |

OTHER PUBLICATIONS

IEEE 802.16 Broadband Wireless Access Working Group <http://ieee802.org/16>, Aggregated H-ARQ, Lim Geunhwi, et al., Nov. 3, 2004, 6 pages.

LTE Quick Reference, RSRP (References Signal Received Power), ShareTechnote, Jun. 6, 2014, 3 pages, http://www.sharetechnote.com/html/Handbook_LTE_RSRP.html.

LTE Quick Reference, TTI Bundling, ShareTechnote, Jun. 6, 2014, 2 pages, http://www.sharetechnote.com/html/Handbook_LTE_TTIBundling.html.

Sekhar, Expert Opinion, TTI Bundling in FDD and TD-LTE, Aug. 13, 2012, 4 pages, http://lteuniversity.com/get_trained/expert_opinion1/b/sekhar/archive/2012/08/13/tti-bundling-in-fdd-and-td-lte.aspx.

Wannstrom, Jeannette, for 3GPP, "Carrier Aggregation explained," http://www.3gpp.org/technologies/keywords-acronyms/101-carrier-aggregation-explained, Jun. 2013, pp. 1-6.

"LTE CA: Carrier Aggregation Tutorial," http://www.radio-electronics.com/info/cellulartelecomms/lte-long-term-evolution/4g-lte-advanced-carrier-channel-aggregation.php, Jul. 15, 2014, pp. 1-9.

Vivanco et al., U.S. Appl. No. 14/310,909, filed Jun. 20, 2014, 42 pages.

Oroskar et al., U.S. Appl. No. 14/281,412, filed May 19, 2014, 37 pages.

\* cited by examiner

PREFERENTIALLY ASSIGNING DATA SLOTS SUBJECT TO BUNDLED ACKNOWLEDGMENTS TO DEVICES THAT SUPPORT CARRIER AGGREGATION

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may derive one or more subpackets from a full packet to be transmitted to a WCD. The RAN may transmit at least one of these subpackets to the particular WCD. The particular WCD may transmit an acknowledgment (positive or negative) in response to each subpacket that it receives.

OVERVIEW

Communication networks in general, and wireless networks in particular, are subject to impairments that can lead to packet corruption and packet loss. For instance, a wireless signal can suffer from various types of attenuation, distortion, reflections, and/or interference. In order to address these problems, and to reduce the effective packet loss rate of a channel, forward error correction (FEC) schemes may be used.

In general, FEC schemes permit a transmitting device, such as a base station, to transmit multiple copies of part or all of a packet to a client node, such as a WCD. Some copies may include FEC coding, for example XOR coding, Reed-Solomon coding, or turbo codes. If a WCD receives a packet with errors, it may be able to apply FEC codes contained within the packet, and/or contained within packets it has previously received or will subsequently receive, to properly decode the packet. In this way, packet error rates may be reduced.

One method of implementing FEC is through the use of hybrid automatic repeat request (HARQ). Using HARQ, a base station that seeks to transmit a full packet to a WCD instead transmits one or more HARQ subpackets. The HARQ subpackets may be derived from the full packet, and therefore may contain copies of part or all of the full packet. Each HARQ subpacket may also contain an extent of FEC coding. The WCD may transmit a negative acknowledgment (N-ACK) in response to each HARQ subpacket it receives until the WCD can decode the full packet from the series of subpackets. Once the WCD is able to decode the full packet, it may transmit a positive acknowledgment (P-ACK) to the base station.

The use of HARQ over frequency-division duplex (FDD) channels may result in N-ACKs and P-ACKs being transmitted at a relatively fixed time offset after their associated HARQ subpackets are transmitted. However, on time-division duplex (TDD) channels, forward-direction (downlink) traffic is separated from reverse-direction (uplink) traffic by allocation of different respective data slots (e.g., time-division multiplexed (TDM) time slots) in a particular frequency band. These data slots may be allocated unequally between the forward and reverse directions in order to accommodate various asymmetric traffic patterns. Thus, in some cases, there may be fewer reverse-direction data slots, in which a WCD can transmit HARQ acknowledgments to a base station, than forward-direction data slots, in which the base station can transmit HARQ subpackets to the WCD.

To accommodate this situation, HARQ acknowledgments may be bundled such that a single HARQ acknowledgment serves to acknowledge more than one HARQ subpacket. For instance, in a possible configuration, a HARQ acknowledgment may acknowledge two consecutive HARQ subpackets. If the HARQ acknowledgment is a P-ACK, then it serves to positively acknowledge both of the two associated HARQ subpackets. However, if the HARQ acknowledgment is an N-ACK, it indicates that one, the other, or both of the two associated HARQ subpackets were not properly received. After such an N-ACK is received, the base station may retransmit the two associated HARQ subpackets, or some variation thereof.

A possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of any properly received HARQ subpacket(s) is not strictly necessary.

In order to possibly offset this disadvantage, a RAN may use a repeating HARQ transmission schedule to transmit data subpackets to WCDs and to receive HARQ acknowledgments from the WCDs. In data slots of the HARQ transmission schedule that are subject to bundled HARQ acknowledgments, the RAN may preferentially schedule transmissions to WCDs that support carrier aggregation. On the other hand, in data slots of the HARQ transmission schedule that not are subject to bundled HARQ acknowledgments, the RAN may preferentially schedule transmissions of HARQ subpackets to WCDs that do not support carrier aggregation.

Carrier aggregation allows a WCD to receive data on more than one carrier frequency simultaneously. Such a WCD may be assigned a primary carrier frequency, e.g., for supporting signaling and data transmission, as well as one or more secondary carrier frequencies, e.g., for supporting data transmission only. Carrier aggregation may improve the overall signal quality that the WCD receives. As such, WCDs using carrier aggregation are more likely than WCDs not using carrier aggregation to properly receive HARQ subpackets in data slots. As a result, assigning WCDs that support carrier aggregation to data slots subject to bundled HARQ acknowledgments may result in the RAN receiving fewer N-ACKs, thus reducing the number of retransmitted HARQ subpackets.

Accordingly, in a first example embodiment, it may be determined that a HARQ transmission schedule from a RAN to WCDs uses HARQ acknowledgment bundling for a first set of two or more data slots, and that the HARQ transmission schedule does not use HARQ acknowledgment bundling for a second set of one or more data slots. It may further be determined that a first WCD supports carrier aggregation when receiving communications from the RAN, and that a second WCD does not support carrier aggregation when receiving communications from the RAN. Based on the first WCD supporting carrier aggregation, the RAN may transmit a first data to the first WCD in the first set of data slots. Based on the second WCD not supporting carrier aggregation, the RAN may transmit a second data to the second WCD in the second set of data slots.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
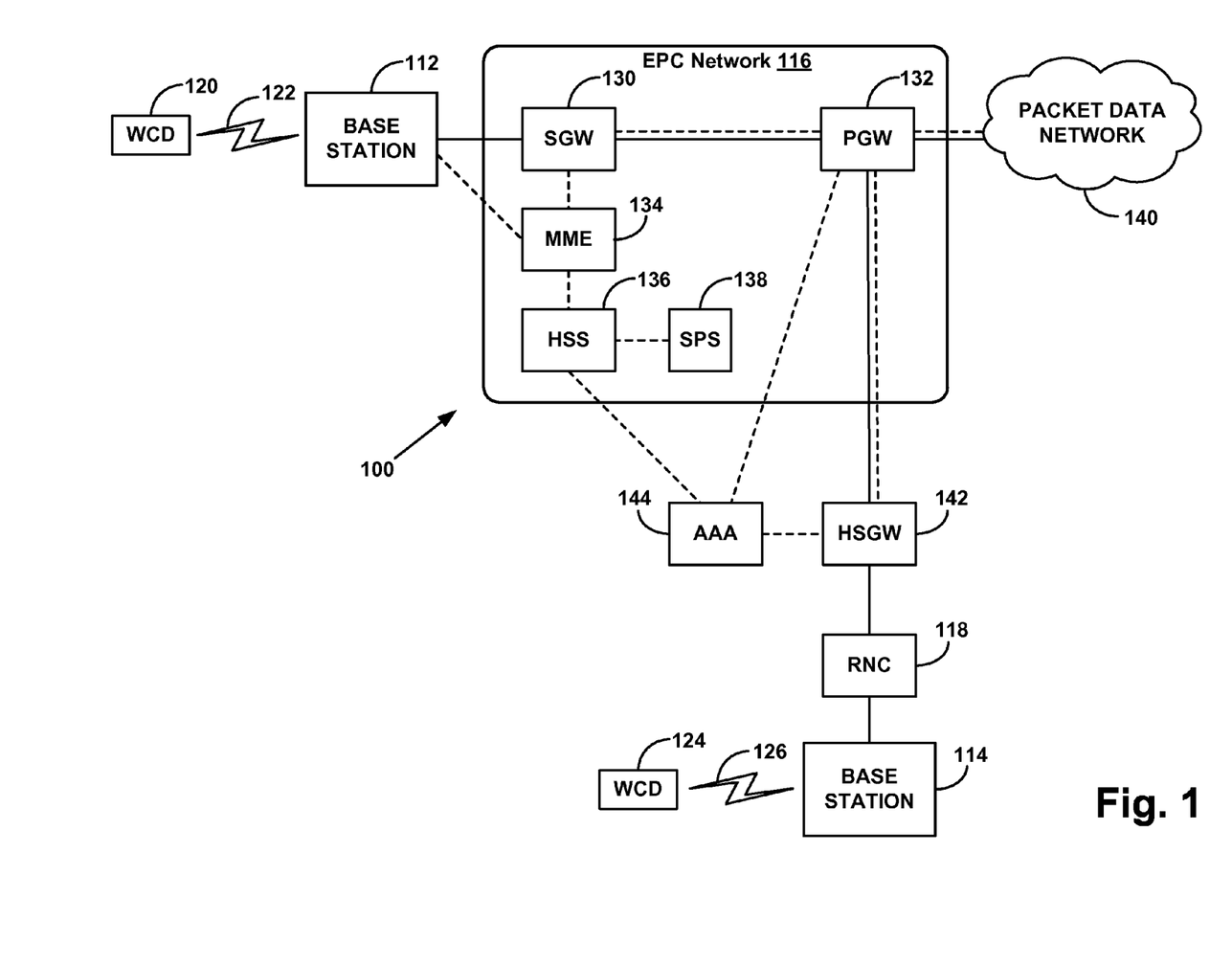
FIG. 1 is a block diagram of a wireless communication system, in accordance with example embodiments.

FIG. 1 illustrates example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base stations can communicate with one or more WCDs. The wireless coverage areas provided by base stations 112 and 114 could be either overlapping or non-overlapping.

A WCD may be referred to as user equipment (UE). For instance, WCDs 120 and 124 could be wireless telephones, wirelessly-equipped handheld, tablet, or laptop computers, or any other type of WCD. Despite this nomenclature, a WCD need not be an end-user device, and may include various types of devices that have limited interactions with human users.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as to access subscriber profiles stored in SPS 138. For example, SPS 138 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between EPC network 116 and a legacy RAN, the latter exemplified in FIG. 1 by base station 114 and RNC 118. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting. Moreover, various disclosed functions can be implemented by any combination of hardware, firmware, and/or software, such as by one or more processors programmed to execute computer instructions for instance.

2. Example Computing Device

Figure 2:
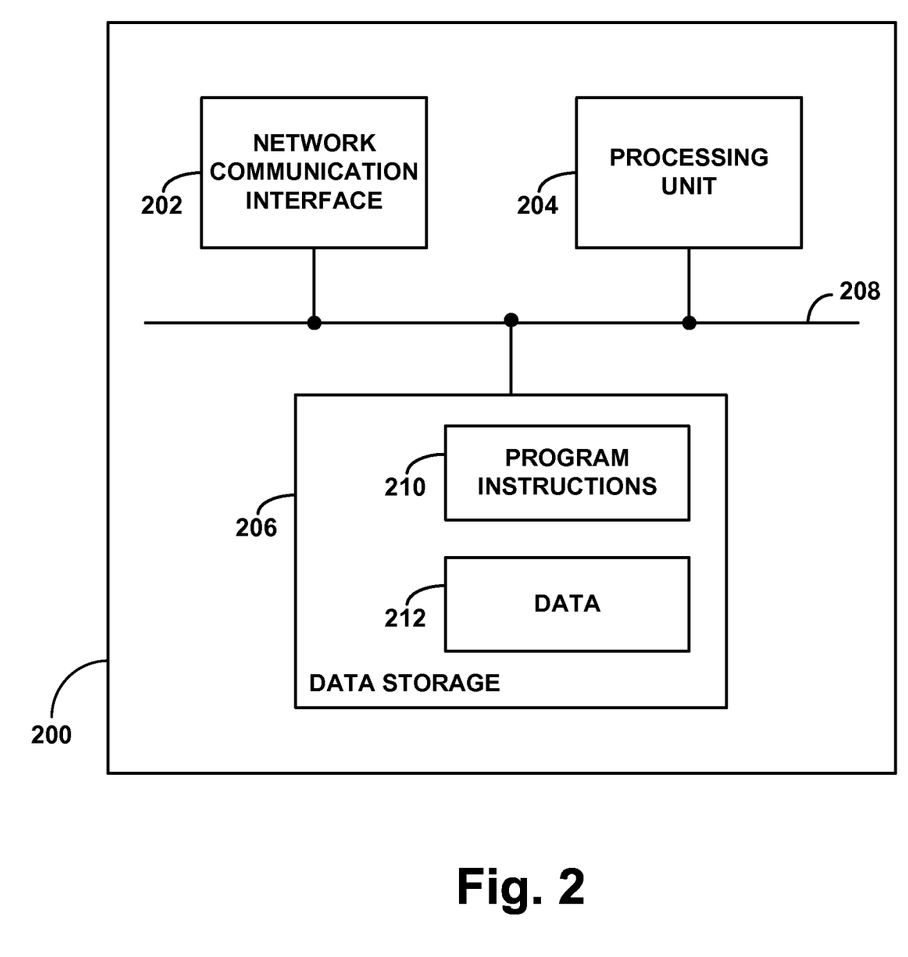
FIG. 2 is a block diagram of a computing device, in accordance with example embodiments.

FIG. 2 is a block diagram of example computing device 200. Computing device 200 could be a standalone general purpose or specialized computing device. Alternatively, computing device 200 could be a WCD or a part of the RAN. Thus, computing device 200 may represent a smartphone, tablet computer, personal computer, base station, MME, SGW, PGW, or some other type of computer or RAN component.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. Carrier Aggregation

Carrier aggregation is an optional feature supported by some network technologies, such as LTE-Advanced. Carrier aggregation may be used to increase the wireless bandwidth, and thus the data rate, between a RAN and a WCD. While the embodiments herein focus on carrier aggregation in the forward direction (RAN to WCD), carrier aggregation may also be applied in the reverse direction (WCD to RAN).

Carrier aggregation allows the RAN to assign, to a WCD, capacity from two or more carrier frequencies at the same time. Without carrier aggregation, the rate at which a WCD can receive data is limited by the WCD's assigned bandwidth, which is usually centered near the WCD's assigned carrier frequency. If the data that the RAN transmits on this carrier frequency is subject to distortion, interference, reflections, or attenuation, the effective data rate that the WCD receives may be less than its theoretical maximum data rate.

However, if more than one carrier frequency is assigned to the WCD, the WCD may utilize bandwidth associated with each of these carrier frequencies. As a result, the WCD's theoretical maximum data rate can be increased. For instance, if three carrier frequencies are assigned to a WCD, the WCD's theoretical maximum data rate may be approximately tripled.

Along with increasing the WCD's theoretical maximum data rate, carrier aggregation is likely to also increase the WCD's effective data rate. Even if all of the assigned carrier frequencies are subject to some distortion, interference, reflections, or attenuation, the WCD's effective data rate is likely to be greater than if the WCD was assigned only one carrier frequency. Further, since wireless channel characteristics may be different for each frequency, with carrier aggregation, the WCD is more likely to be assigned at least one carrier frequency on which the signals received by the WCD are subject to less distortion, interference, reflections, or attenuation. Thus, when receiving data on this carrier frequency, the WCD may be able to achieve a high effective data rate.

Figure 3A:
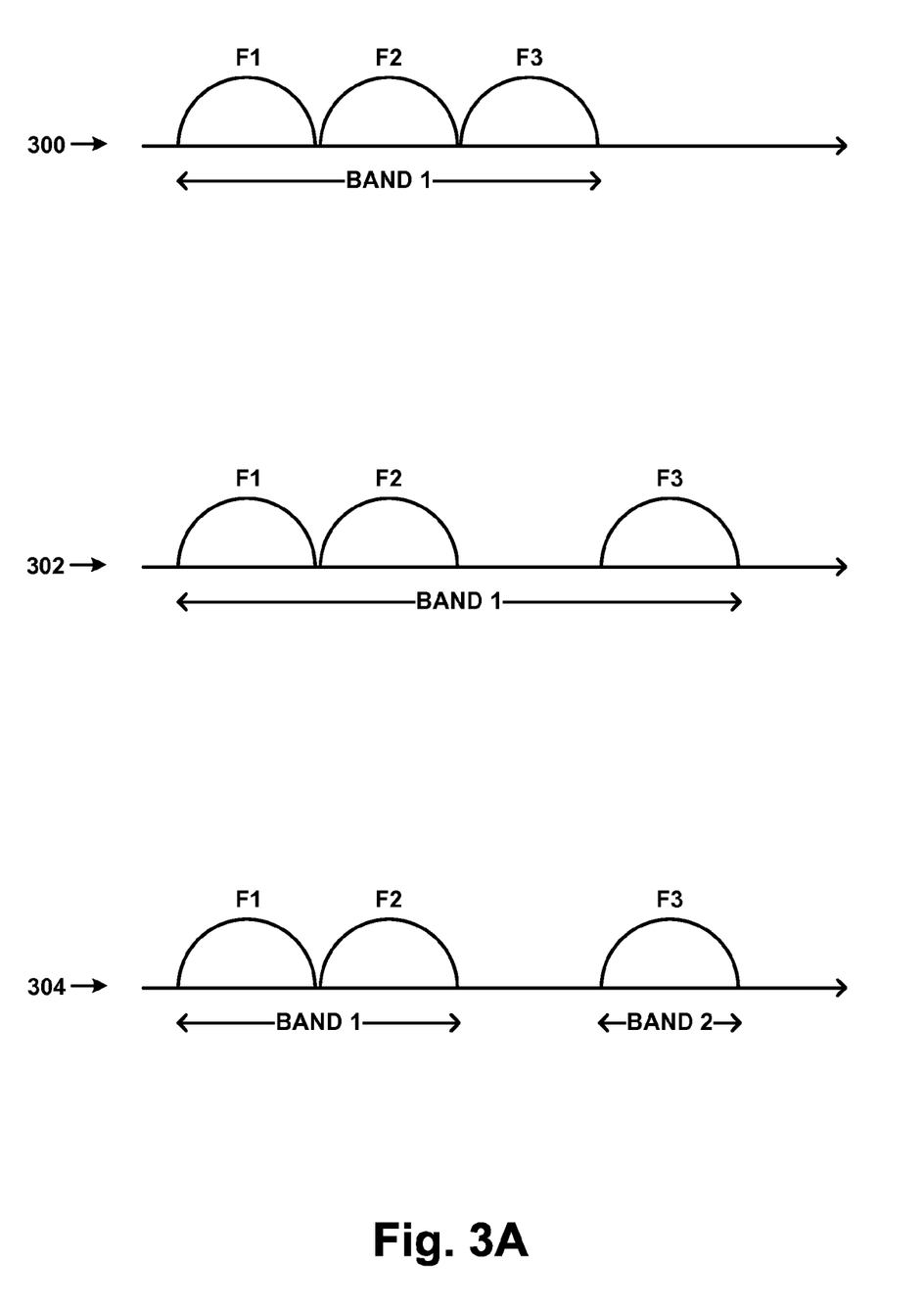
FIG. 3A illustrates various frequency arrangements for carrier aggregation, in accordance with example embodiments.

FIG. 3A illustrates three possible arrangements of carrier aggregation, in accordance with example embodiments. Each of these arrangements involve the aggregation of three carrier frequencies, but in practice the number of carrier frequencies aggregated may be two or more than three.

Arrangement 300 involves assignment, to a WCD, of three contiguous carrier frequencies in the same band (F1, F2, and F3). Thus, the WCD may be able to treat these aggregated carrier frequencies as if they were a single enlarged channel. In this instance, the WCD may be able to use only one transceiver to receive data on all three carrier frequencies.

Arrangement 302 involves assignment, to a WCD, of at least some non-contiguous carrier frequencies in the same band. Carrier frequencies F1 and F2 are contiguous with one another, but F3 is not contiguous with either of F1 or F2. As such, the WCD may use two or more transceivers to receive data on all three carrier frequencies.

Similarly, arrangement 304 involves the assignment, to a WCD, of at least some non-contiguous carrier frequencies in different bands. Carrier frequencies F1 and F2 are contiguous with one another in band 1, but F3 is in band 2 and therefore not contiguous with either of F1 or F2. In this case as well, the WCD may use two or more transceivers to receive data on all three carrier frequencies.

When carriers are aggregated, each carrier frequency may be referred to as a component carrier frequency. Of the component carrier frequencies, one may be a primary carrier frequency and the others may be secondary carrier frequencies. The primary carrier frequency may be the carrier frequency that the WCD receives with the strongest signal. However, other factors may be taken into account as well, or instead of, signal strength when assigning a primary carrier frequency.

In some embodiments, all signaling between the WCD and RAN can take place on the primary carrier frequency, while the primary and secondary carrier frequencies are used for data transmission. Nonetheless, implementations in which signaling takes place on one or more secondary carrier frequencies may be possible.

With carrier aggregation, each component carrier frequency may be used to define a different wireless coverage area. In order for the carrier frequencies from different wireless coverage areas to be used to transmit data to a particular WCD, these wireless coverage areas may overlap to some extent.

Figure 3B:
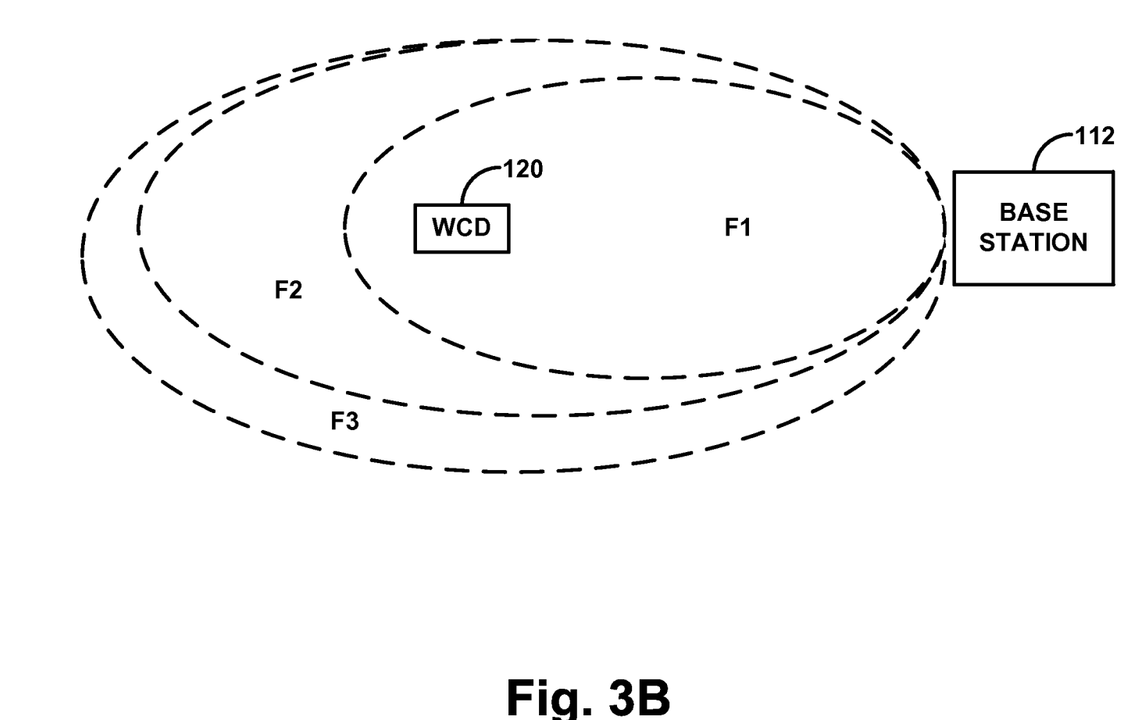
FIG. 3B depicts the coverage of several wireless coverage areas each defined by different carrier frequencies, in accordance with example embodiments.

FIG. 3B depicts the coverage of several wireless coverage areas each defined by different carrier frequencies. In FIG. 3B, base station 112 defines three wireless coverage areas defined by carrier frequencies F1, F2, and F3, respectively. Each of these wireless coverage areas provide progressively more coverage. The wireless coverage area defined by carrier frequency F2 provides a superset of the coverage provided by the wireless coverage area defined by carrier frequency F1. Likewise, the wireless coverage area defined by carrier frequency F3 provides a superset of the coverage provided by the wireless coverage area defined by carrier frequency F2. Other overlapping or partially overlapping sets of wireless coverage areas may also be used for carrier aggregation.

WCD 120 is located within the coverage of each of these wireless coverage areas. Thus, WCD 120 may be able to use carrier aggregation to communicate with base station 112 using any two or all three of these wireless coverage areas.

4. Example HARQ Communication

For purposes of illustration, this section describes examples of HARQ transmissions between base station 112 and WCD 120. In these examples, base station 112 transmits HARQ subpackets (possibly containing payload and/or FEC bits) to WCD 120 on a forward-direction channel, and WCD 120 transmits HARQ acknowledgments to base station 112 on a reverse direction channel.

Nonetheless, the procedures described herein may be carried out in other ways. For instance, the HARQ transmissions may take place between other types of devices, such as base station 114 and WCD 124. Alternatively, or additionally, the HARQ subpackets may be transmitted on a reverse-direction channel and the HARQ acknowledgments may be transmitted on a forward-direction channel.

Figure 4:
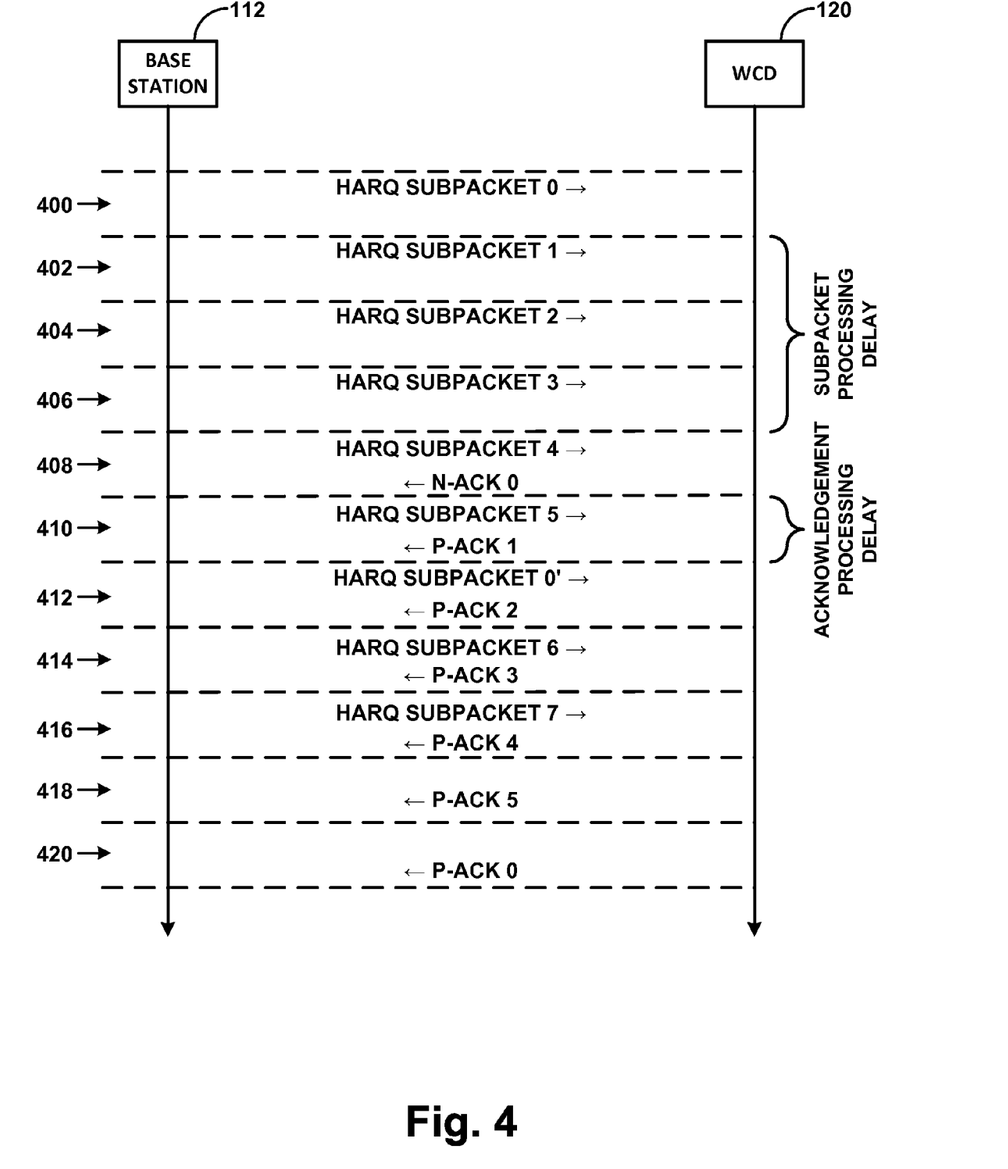
FIG. 4 illustrates unbundled HARQ transmissions, in accordance with example embodiments.

FIG. 4 illustrates a series of HARQ transmissions between base station 112 and WCD 120 in an FDD system. Thus, in each of data slots 400-420, either or both base station 112 and WCD 120 may transmit to one another, perhaps simultaneously, on different frequencies. For purposes of simplicity, it is assumed that base station 112 has eight HARQ subpackets queued to transmit to WCD 120.

Starting in data slot 400, base station 112 begins transmitting the HARQ subpackets to WCD 120. In data slot 400, base station 112 transmits HARQ subpacket 0. In data slot 402, base station 112 transmits HARQ subpacket 1. In data slot 404, base station 112 transmits HARQ subpacket 2. In data slot 406, base station 112 transmits HARQ subpacket 3.

As an example, it is assumed that WCD 120 uses three full data slots to process each HARQ subpacket. Thus, the first opportunity that WCD 120 has to transmit a HARQ acknowledgment to base station 112 is data slot 408. In this data slot, WCD 120 N-ACKs HARQ subpacket 0, indicating that WCD 120 was unable to properly process or decode this subpacket. It is also assumed, for example, that base station 112 uses one full data slot to process each HARQ acknowledgment. Therefore, the earliest data slot in which base station 112 can respond to the N-ACK is data slot 412.

In data slot 412, base station 112 transmits HARQ subpacket 0', which may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. WCD 120 also transmits a P-ACK for HARQ subpacket 2 in this data slot.

In the interim, base station 112 transmits HARQ subpacket 4 to WCD 120 in data slot 408. Additionally, base station 112 transmits HARQ subpacket 5 to WCD 120 in data slot 410, and WCD 120 transmits a P-ACK of HARQ subpacket 1 also in data slot 410.

In data slots 414 and 416, base station 112 transmits HARQ subpackets 6 and 7, respectively, and WCD 120 transmits P-ACKs to HARQ subpackets 3 and 4, respectively. In data slots 418 and 420, base station 112 does not transmit HARQ subpackets because it has transmitted all eight that it had queued for transmission. However, should any further N-ACKs be received from WCD 120, base station 112 may retransmit the associated HARQ subpackets in these or subsequent forward-direction data slots. Nonetheless, in data slots 418 and 420, WCD 120 transmits P-ACKs to HARQ subpackets 5 and 0, respectively.

The latter P-ACK indicates that WCD 120 properly processed and decoded HARQ subpacket 0. For instance, this P-ACK may indicate that WCD 120 successfully combined the information that it received in HARQ subpacket 0 and HARQ subpacket 0' during data slots 400 and 412. This P-ACK may also indicate that WCD 120 was able to properly process and decode the full packet from which these subpackets were derived.

FIG. 4 depicts just one possible HARQ transmission scenario. Other scenarios may exist. In some of these scenarios, there may be more or fewer N-ACKs, and the general pattern of HARQ subpacket transmissions and associated HARQ acknowledgments may vary. Thus, FIG. 4 should be considered illustrative and non-limiting.

Figure 5:
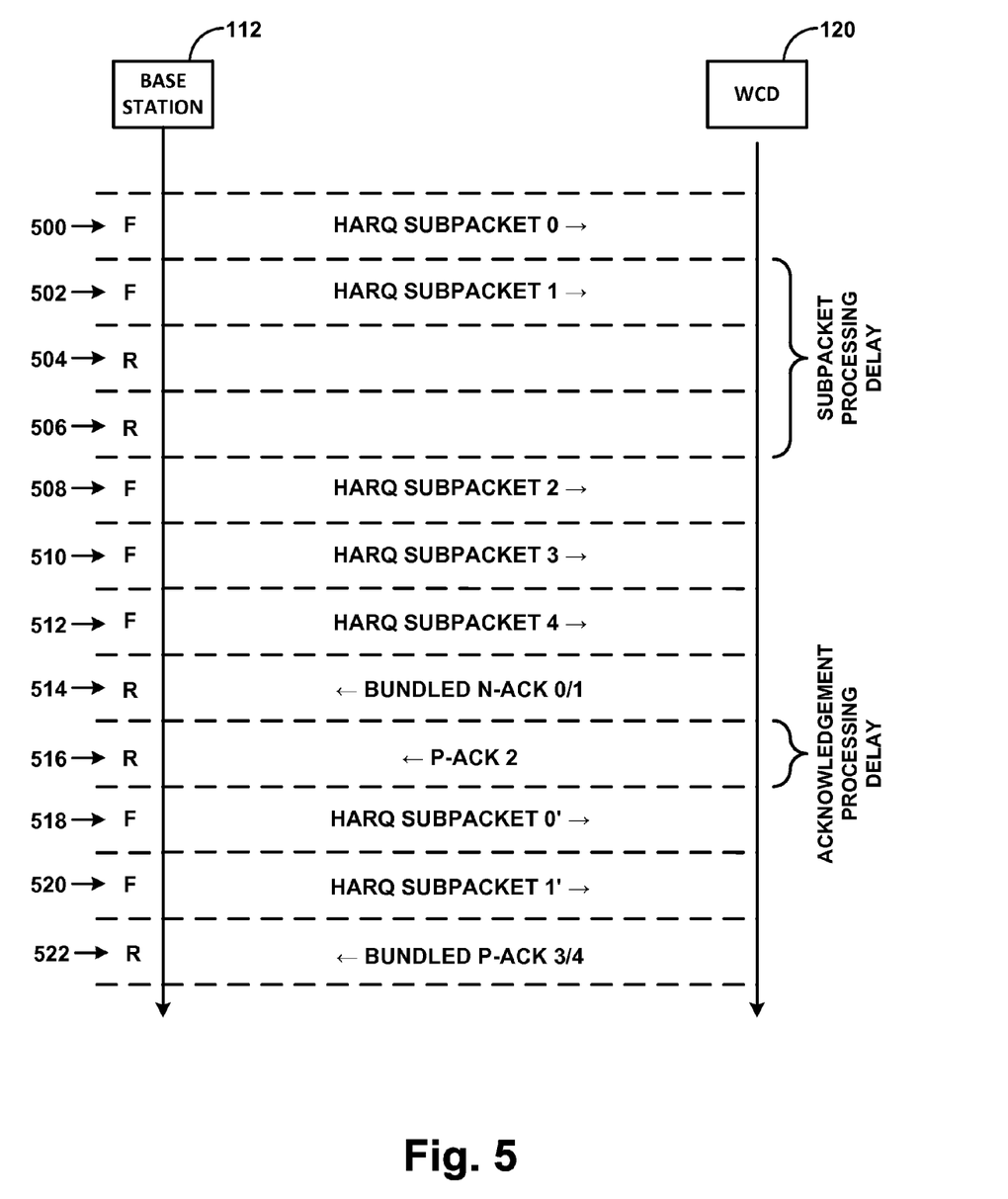
FIG. 5 illustrates bundled HARQ transmissions, in accordance with example embodiments.

FIG. 5 illustrates a series of HARQ transmissions between base station 112 and WCD 120 in a TDD system. In a TDD system, each data slot may be used for either forward-direction transmission or reverse-direction transmission. Thus, in each of data slots 500-522, either base station 112 or WCD 120, but not both, may transmit.

In such a TDD system, the number of data slots per frame (where a frame is a repeating sequence of consecutive data slots) may be asymmetric. For instance, to accommodate client/server traffic in which client devices tend to receive more bearer data than they transmit, more TDD slots may be dedicated to supporting forward-direction traffic than reverse-direction traffic. As just one example, FIG. 5 depicts twelve data slots, seven of which are forward-direction (indicated by an "F"), and five of which are reverse-direction (indicated by an "R").

Due to such asymmetry, there may be more opportunities for HARQ transmission than HARQ acknowledgment transmission in a given frame. Thus, it may be beneficial to bundle HARQ acknowledgments. When HARQ acknowledgments are bundled, a single HARQ acknowledgment may serve to acknowledge more than one HARQ subpacket. As a possible result, more HARQ transmissions can be supported with fewer data slots.

For instance, in a possible configuration that is depicted in FIG. 5, each HARQ acknowledgment may acknowledge up to two consecutive HARQ subpackets. If the HARQ acknowledgment is a P-ACK, then it serves to positively acknowledge the associated HARQ subpackets. However, if the HARQ acknowledgment is an N-ACK for two HARQ subpackets, it indicates that one, the other, or both of these HARQ subpackets were not properly received. After such an N-ACK is received, the base station may retransmit the two associated HARQ subpackets, or some variation of these HARQ subpackets.

In FIG. 5, base station 112 transmits HARQ subpackets 0 and 1 in forward-direction data slots 500 and 502, respectively. As was the case for FIG. 4, it is assumed that WCD 120 uses three full data slots to process each HARQ subpacket and that base station 112 uses one full data slot to process each HARQ acknowledgment. Thus, in reverse-direction data slots 504 and 506, WCD 120 is not yet able to acknowledge HARQ subpackets 0 or 1.

In forward-direction data slots 508, 510, and 512, base station 112 transmits HARQ subpackets 2, 3, and 4, respectively. In reverse-direction data slot 514, WCD 120 has its first opportunity to acknowledge HARQ subpackets 0 and 1. WCD 120 transmits a bundled N-ACK for HARQ subpackets 0 and 1 in this data slot. This indicates that WCD 120 was unable to properly process or decode either HARQ subpacket 0, HARQ subpacket 1, or both.

On the other hand, in reverse-direction data slot 516, WCD 120 transmits a P-ACK for HARQ subpacket 2, indicating that WCD 120 was able to properly process and decode HARQ subpacket 2. Regardless, in forward-direction data slots 518 and 520, base station 112 transmits HARQ subpackets 0' and 1', respectively.

HARQ subpacket 0' may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. Similarly, HARQ subpacket 1' may be identical to HARQ subpacket 1. Alternatively, HARQ subpacket 1' may be different from HARQ subpacket 1', but derived from the same full packet as HARQ subpacket 1. Likewise, HARQ subpacket 1 and HARQ subpacket 1' may have similar or the same payload bits, but different FEC bits.

In reverse-direction data slot 522, WCD 120 may acknowledge HARQ subpackets 3 and 4. Therefore WCD 120 transmits a bundled P-ACK for HARQ subpackets 3 and 4 in this data slot. This indicates that WCD 120 was able to properly process and decode both HARQ subpacket 3 and HARQ subpacket 4.

As demonstrated above, a possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of the properly received HARQ subpackets is not strictly necessary.

5. Example Operations

Carrier aggregation may be combined with HARQ protocols. For instance, in some embodiments, a RAN may transmit HARQ subpackets to a WCD separately on each aggregated carrier frequency, and the WCD may transmit corresponding acknowledgments separately on the respective carrier frequencies. In other embodiments, two or more aggregated carrier frequencies may be combined into a single logical channel for purposes of HARQ protocols.

As noted above, WCDs using carrier aggregation are more likely to properly receive HARQ subpackets than WCDs not using carrier aggregation. Consequently, it may be advantageous to assign WCDs that support carrier aggregation to data slots subject to bundled HARQ acknowledgments. Doing so may result in the RAN receiving fewer N-ACKs, thus reducing the number of retransmitted HARQ subpackets.

The RAN may be aware of which slots in a frame are subject to bundled HARQ acknowledgments due to the frame's configuration. For instance, in FIG. 5, the pattern of slots 500-516 may repeat in each frame (i.e., slots 500-516 are one full frame and slots 518, 520, and 522 are the first three slots of the next frame). Thus, the RAN may be able to conclude that HARQ acknowledgments for slots 500 and 502 will be bundled, that HARQ acknowledgments for slots 510 and 512 will be bundled, and so on. The configuration of forward-direction and reverse-direction frames between the RAN and a particular WCD may be pre-established or negotiated by these devices.

Therefore, the RAN may preferentially schedule transmissions to a WCD using carrier aggregation in these data slots 500 and 502. This WCD may transmit a corresponding HARQ acknowledgment in data slot 514. Similarly, data slots 510 and 512 are also subject to bundled HARQ acknowledgments. The RAN may preferentially schedule transmissions to the same WCD, or a different WCD using carrier aggregation, in these data slots. That WCD may transmit a corresponding HARQ acknowledgment in data slot 522.

Conversely, the RAN may preferentially schedule transmissions to a WCD not using carrier aggregation in data slots not subject to bundled HARQ acknowledgments. Thus, for instance, since data slot 508 is not subject to bundled HARQ acknowledgments, this data slot may be assigned to a WCD not using carrier aggregation.

In some situations, the RAN may consider other factors when scheduling transmissions to WCDs. Therefore, the RAN may, from time to time, schedule transmissions to a WCD using carrier aggregation in data slots not subject to bundled HARQ acknowledgments. Similarly, the RAN may, from time to time, schedule transmissions to a WCD not using carrier aggregation in data slots subject to bundled HARQ acknowledgments. However, when otherwise possible, the RAN may prefer to schedule transmissions to a WCD using carrier aggregation in data slots subject to bundled HARQ acknowledgments, and may prefer to schedule transmissions to a WCD not using carrier aggregation in data slots not subject to bundled HARQ acknowledgments.

Figure 6:
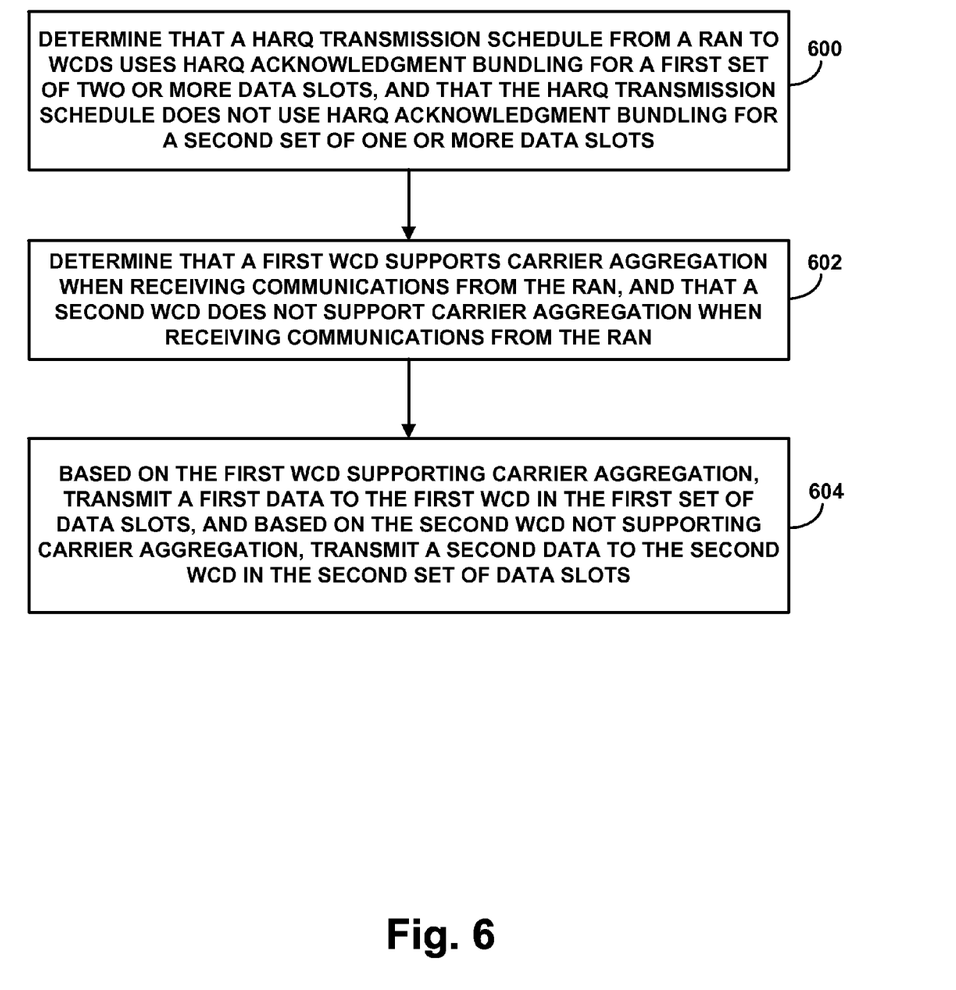
FIG. 6 is a flow chart, in accordance with example embodiments.

FIG. 6 is a flow chart in accordance with example embodiments. The operations illustrated by this flow chart may be carried out by a computing device, such as computing device 200. In some embodiments, computing device 200 may represent a RAN device, such as a base station. Thus, at least some of the following steps may be carried out by a base station or some other RAN device. On the other hand, at least some of the following steps may be carried out by a WCD for reverse-direction HARQ transmissions from the WCD to a RAN device.

At block 600 of FIG. 6, it may be determined that a HARQ transmission schedule from a RAN to WCDs uses HARQ acknowledgment bundling for a first set of two or more data slots, and that the HARQ transmission schedule does not use HARQ acknowledgment bundling for a second set of one or more data slots.

At step 602, it may be determined that a first WCD supports carrier aggregation when receiving communications from the RAN, and that a second WCD does not support carrier aggregation when receiving communications from the RAN.

At step 604, possibly based on the first WCD supporting carrier aggregation, the RAN may transmit a first data to the first WCD. The first data may be transmitted in the first set of data slots. Possibly based on the second WCD not supporting carrier aggregation, the RAN may transmit a second data to the second WCD. The second data may be transmitted in the second set of data slots.

Determining that the first WCD supports carrier aggregation may involve determining that the first WCD is configured to receive communications from the RAN on a primary carrier frequency and at least one secondary carrier frequency. As such, the first WCD may be further configured to receive signaling and data traffic on the primary carrier frequency and only data traffic on the secondary carrier frequency.

Additionally, the first WCD may be configured to receive communications on the primary carrier frequency and the at least one secondary carrier frequency using between 5 and 20 Megahertz of bandwidth per carrier frequency. However, other quantities of bandwidth per carrier are possible (e.g., 1, 2.5, 10, or 15 Megahertz).

Determining that the second WCD does not support carrier aggregation may involve determining that the second WCD is configured to receive communications from the RAN only on a primary carrier frequency. Thus, the second WCD may receive signaling and data traffic on the primary carrier frequency.

Determining that the HARQ transmission schedule uses HARQ acknowledgment bundling for the first set of data slots may involve determining that, in response to a plurality of HARQ subpackets that the RAN transmits in the first set of data slots, the RAN receives a single HARQ acknowledgment message. The single HARQ acknowledgment message may be a positive acknowledgment message that indicates that each of the plurality of HARQ subpackets was successfully received. On the other hand, the single HARQ acknowledgment message may be a negative acknowledgment message that indicates that at least one of the plurality of HARQ subpackets was not successfully received.

Additionally, one or more HARQ subpackets may be derived from one or more full packets. If the single HARQ acknowledgment message is an N-ACK message that indicates that at least one of the plurality of HARQ subpackets was not successfully received by the WCD, a replacement HARQ subpacket may be transmitted to the WCD. A HARQ subpacket not successfully received by the WCD, as well as the replacement HARQ subpacket, may be derived from the same, common full packet.

The WCDs and RAN may communicate using a TDD wireless channel in which the forward-direction traffic is separated from reverse-direction traffic by allocation of different respective data slots for forward-direction traffic and reverse-direction traffic. However, the embodiments herein may be used with other types of wireless channels, or wireline channels, as well.

In some embodiments, it may be determined that the HARQ transmission schedule uses HARQ acknowledgment bundling for a third set of two or more data slots. It may also be determined that a third WCD supports carrier aggregation when receiving communications from the RAN, Possibly based on the third WCD supporting carrier aggregation, a third data may be transmitted to the third WCD. The third data may be transmitted in the third set of data slots.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, example embodiments can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining that a hybrid automatic repeat request (HARQ) transmission schedule specifies HARQ acknowledgment bundling for a first set of two or more data slots, and that the HARQ transmission schedule does not specify HARQ acknowledgment bundling for a second set of one or more data slots, wherein the HARQ transmission schedule is from a radio access network (RAN) to wireless communication devices (WCDs);
   determining, by the RAN, that a first WCD supports carrier aggregation when receiving communications from the RAN, and that a second WCD does not support carrier aggregation when receiving communications from the RAN;
   based on (i) the first WCD supporting carrier aggregation and (ii) the HARQ transmission schedule specifying HARQ acknowledgement bundling for the first set of data slots, transmitting, by the RAN, a first data to the first WCD in the first set of data slots; and
   based on (i) the second WCD not supporting carrier aggregation and (ii) the HARQ transmission schedule not specifying HARQ acknowledgement bundling for the second set of data slots, transmitting, by the RAN, a second data to the second WCD in the second set of data slots.

2. The method of claim 1, wherein determining that the first WCD supports carrier aggregation comprises determining that the first WCD is configured to receive communications from the RAN on a primary carrier frequency and at least one secondary carrier frequency, and wherein the first WCD is further configured to receive signaling and data traffic on the primary carrier frequency and only data traffic on the secondary carrier frequency.

3. The method of claim 2, wherein the first WCD is configured to receive communications on the primary carrier frequency and the at least one secondary carrier frequency using between 5 and 20 Megahertz of bandwidth per carrier frequency.

4. The method of claim 1, wherein determining that the second WCD does not support carrier aggregation comprises determining that the second WCD is configured to receive communications from the RAN only on a primary carrier frequency.

5. The method of claim 1, wherein determining that the HARQ transmission schedule specifies HARQ acknowledgment bundling for the first set of data slots comprises determining that, in response to a plurality of HARQ subpackets that the RAN transmits in the first set of data slots, the RAN receives a single HARQ acknowledgment message.

6. The method of claim 5, wherein the single HARQ acknowledgment message is a positive acknowledgment message that indicates that each of the plurality of HARQ subpackets was successfully received.

7. The method of claim 5, wherein the single HARQ acknowledgment message is a negative acknowledgment message that indicates that at least one of the plurality of HARQ subpackets was not successfully received.

8. The method of claim 1, wherein the WCDs and RAN communicate using a time division duplex (TDD) wireless channel in which the forward-direction traffic is separated from reverse-direction traffic by allocation of different respective data slots for forward-direction traffic and reverse-direction traffic.

9. The method of claim 1, further comprising:
   determining that the HARQ transmission schedule specifies HARQ acknowledgment bundling for a third set of two or more data slots;
   determining that a third WCD supports carrier aggregation when receiving communications from the RAN; and
   based on (i) the third WCD supporting carrier aggregation and (ii) the HARQ transmission schedule specifying HARQ acknowledgement bundling for the third set of data slots, transmitting, by the RAN, a third data to the third WCD in the third set of data slots.

10. An article of manufacture including a non-transitory computer-readable medium, having stored thereon program instructions that, upon execution by a radio access network (RAN) device, cause the RAN device to perform operations comprising:
    determining that a hybrid automatic repeat request (HARQ) transmission schedule specifies HARQ acknowledgment bundling for a first set of two or more data slots, and that the HARQ transmission schedule does not specify HARQ acknowledgment bundling for a second set of one or more data slots, wherein the HARQ transmission schedule is from a RAN to wireless communication devices (WCDs);

determining that a first WCD supports carrier aggregation when receiving communications from the RAN, and that a second WCD does not support carrier aggregation when receiving communications from the RAN;

based on (i) the first WCD supporting carrier aggregation and (ii) the HARQ transmission schedule specifying HARQ acknowledgement bundling for the first set of data slots, transmitting a first data to the first WCD in the first set of data slots; and based on (i) the second WCD not supporting carrier aggregation and (ii) the HARQ transmission schedule not specifying HARQ acknowledgement bundling for the second set of data slots, transmitting a second data to the second WCD in the second set of data slots.

11. The article of manufacture of claim 10, wherein determining that the first WCD supports carrier aggregation comprises determining that the first WCD is configured to receive communications from the RAN on a primary carrier frequency and at least one secondary carrier frequency, and wherein the first WCD is further configured to receive signaling and data traffic on the primary carrier frequency and only data traffic on the secondary carrier frequency.

12. The article of manufacture of claim 11, wherein the first WCD is configured to receive communications on the primary carrier frequency and the at least one secondary carrier frequency using between 5 and 20 Megahertz of bandwidth per carrier frequency.

13. The article of manufacture of claim 10, wherein determining that the second WCD does not support carrier aggregation comprises determining that the second WCD is configured to receive communications from the RAN only on a primary carrier frequency.

14. The article of manufacture of claim 10, wherein determining that the HARQ transmission schedule specifies HARQ acknowledgment bundling for the first set of data slots comprises determining that, in response to a plurality of HARQ subpackets that the RAN transmits in the first set of data slots, the RAN receives a single HARQ acknowledgment message.

15. The article of manufacture of claim 14, wherein the single HARQ acknowledgment message is a positive acknowledgment message that indicates that each of the plurality of HARQ subpackets was successfully received.

16. The article of manufacture of claim 10, wherein the single HARQ acknowledgment message is a negative acknowledgment message that indicates that at least one of the plurality of HARQ subpackets was not successfully received.

17. The article of manufacture of claim 10, wherein the WCDs and RAN communicate using a time division duplex (TDD) wireless channel in which the forward-direction traffic is separated from reverse-direction traffic by allocation of different respective data slots for forward-direction traffic and reverse-direction traffic.

18. The article of manufacture of claim 10, the operations further comprising:

determining that the HARQ transmission schedule specifies HARQ acknowledgment bundling for a third set of two or more data slots;

determining that a third WCD supports carrier aggregation when receiving communications from the RAN; and based on (i) the third WCD supporting carrier aggregation and (ii) the HARQ transmission schedule specifying HARQ acknowledgement bundling for the third set of data slots, transmitting a third data to the third WCD in the third set of data slots.

19. A radio access network (RAN) device comprising:

at least one processor;

data storage; and program instructions, stored in the data storage, that upon execution by the at least one processor cause the RAN device to perform operations comprising:

determining that a hybrid automatic repeat request (HARQ) transmission schedule specifies HARQ acknowledgment bundling for a first set of two or more data slots, and that the HARQ transmission schedule does not specify HARQ acknowledgment bundling for a second set of one or more data slots, wherein the HARQ transmission schedule is from a RAN to wireless communication devices (WCDs);

determining that a first WCD supports carrier aggregation when receiving communications from the RAN, and that a second WCD does not support carrier aggregation when receiving communications from the RAN;

based on (i) the first WCD supporting carrier aggregation and (ii) the HARQ transmission schedule specifying HARQ acknowledgement bundling for the first set of data slots, transmitting a first data to the first WCD in the first set of data slots; and based on (i) the second WCD not supporting carrier aggregation and (ii) the HARQ transmission schedule not specifying HARQ acknowledgement bundling for the second set of data slots, transmitting a second data to the second WCD in the second set of data slots.

20. The computing device of claim 19, wherein determining that a first WCD supports carrier aggregation comprises determining that the first WCD is configured to receive communications from the RAN on a primary carrier frequency and at least one secondary carrier frequency, and wherein the first WCD is further configured to receive signaling and data traffic on the primary carrier frequency and only data traffic on the secondary carrier frequency.

* * * * *